Jan. 19, 1943. A. R. SHAW 2,309,018
METHOD OF MAKING COMPOSITE STRIP STOCK
Filed June 19, 1940 2 Sheets-Sheet 1

INVENTOR
Arthur R. Shaw
BY
his ATTORNEYS

Jan. 19, 1943. A. R. SHAW 2,309,018
METHOD OF MAKING COMPOSITE STRIP STOCK
Filed June 19, 1940 2 Sheets-Sheet 2
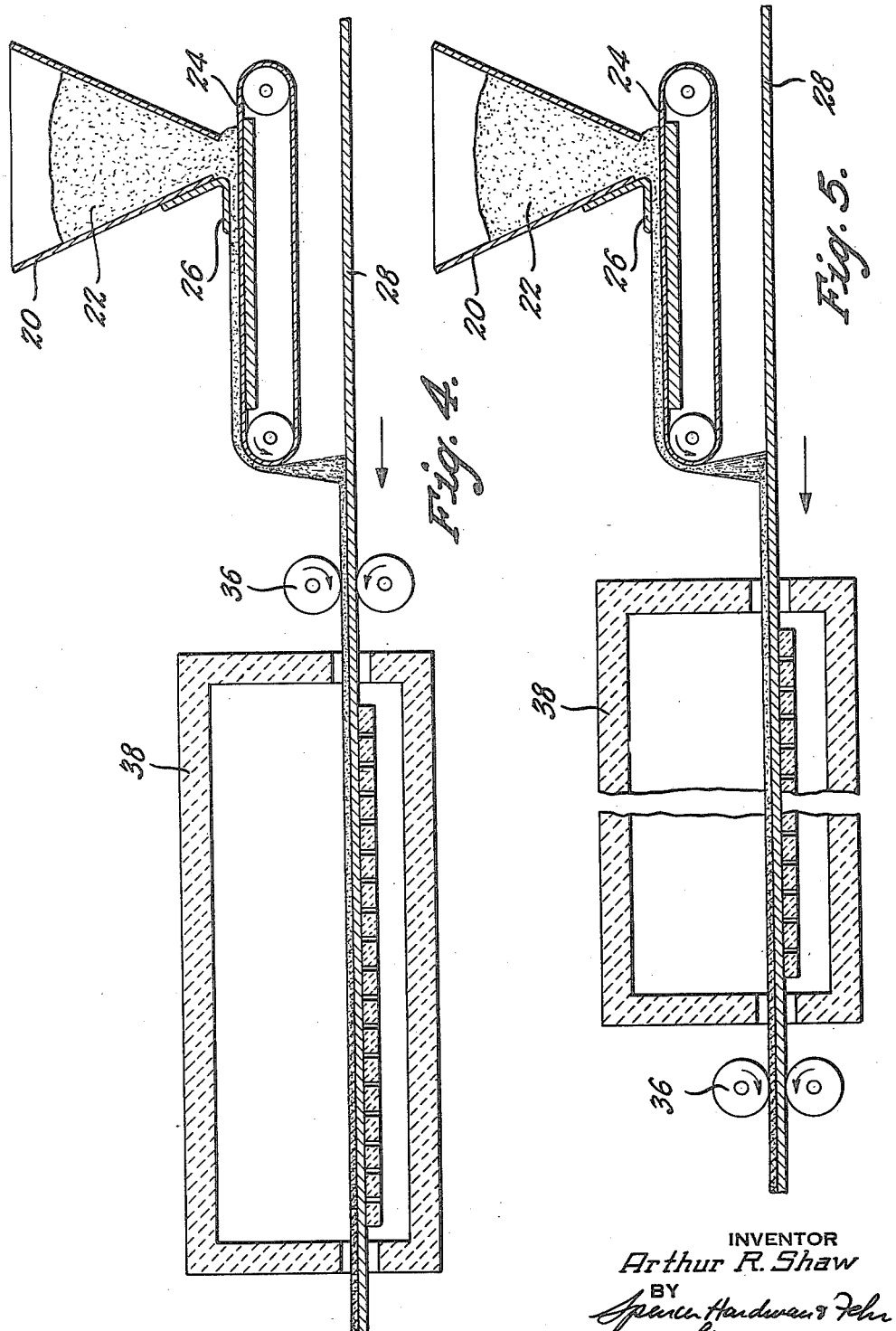

Patented Jan. 19, 1943

2,309,018

UNITED STATES PATENT OFFICE 2,309,018

METHOD OF MAKING COMPOSITE STRIP STOCK

Arthur R. Shaw, Dayton, Ohio, assignor to General Motors Corporation, Detroit, Mich., a corporation of Delaware Application June 19, 1940, Serial No. 341,344

4 Claims. (Cl. 29—189)

This invention relates to a method of depositing uniform layers of powdered material upon supporting surfaces and is particularly concerned with the method of depositing a uniform thickness of powdered material upon an uneven surface.

An object of the invention is to provide a continuous or intermittent method for distributing powdered material in a layer of uniform thickness upon the surface of an uneven support.

In carrying out the above object it is a further object to distribute a layer of powdered material upon an even surface, such as the surface of an endless belt, and then progressively remove said layer from said belt and deposit the same upon an uneven surface moving in the same or opposite direction as said belt.

Another object is to provide a method for making composite elements which include a porous metal layer bonded to a more dense metal layer wherein the thickness of the powdered metal layer is maintained uniform regardless of warpage in the more dense metal element.

A still further object is to provide a method for making porous strip material continuously wherein the density of the porous strip may be varied from one side thereof to the other if desired.

Further objects and advantages of the present invention will be apparent from the following description, reference being had to the accompanying drawings wherein a preferred embodiment of the present invention is clearly shown.

In the drawings:

Fig. 4 is a view similar to Fig. 1 schematically showing a sintering furnace together with pressure rolls for compacting powdered material upon a strip prior to the sintering operation and Fig. 5 is a view similar to Fig. 4 wherein pressure rolls are provided at the exit of the points.

Figure 1:
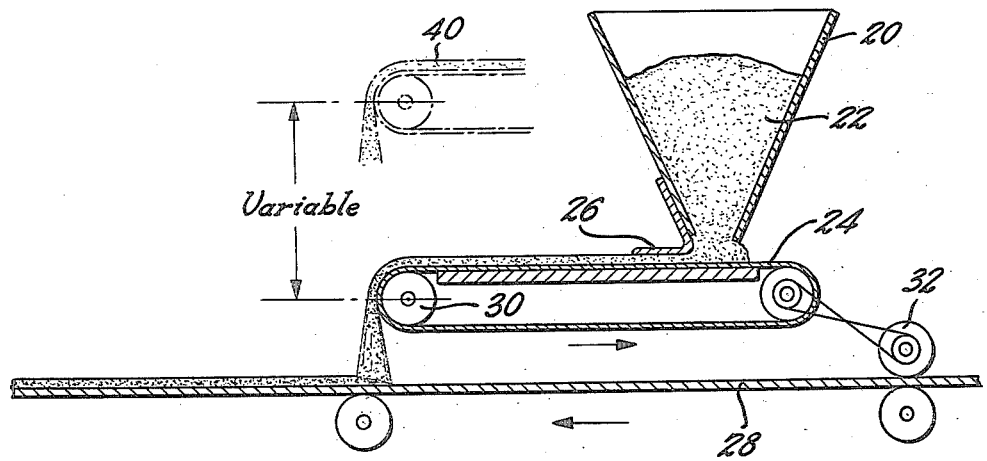
Fig. 1 illustrates one form of the invention wherein powdered material is being uniformly distributed on the surface of a supporting strip.

In distributing powdered material, for example metal powders upon the surface of supporting elements where the powdered material is in the loose noncompacted condition, it is extremely difficult to obtain a layer of metal of uniform thickness due to slight unevenness in the surface of the support. For example, when distributing powdered metal continuously upon the surface of a steel strip it is quite difficult to get a layer of uniform thickness upon the surface of the strip unless the strip has been passed thru straightening rolls to remove warpage therefrom. Furthermore, in many instances, it is desirable to have the strip curved in contour to a slight amount, or to include other irregularities on the surface thereof. In such cases, it is practically impossible to obtain a layer of powdered material of uniform thickness thereon by spreading the powdered material on the strip or element and then scraping or smoothing the layer off to the desired thickness, since, when such irregularities are present, the layer is of less thickness at the high points thereof which is objectionable.

The present method eliminates these past difficulties and presents a procedure by which a layer of uniform thickness may be distributed upon any supporting element or surface regardless of the irregularities providing such irregularities are so formed that powdered material deposited thereon will remain in place due to the fact that the angle of slope of the surface at the irregularities is less than the angle of repose of the particles of material.

In Patent No. 2,198,253 to Koehring assigned to the assignee of the present invention conventional types of apparatus are shown for distributing a uniform layer of metal powder upon a substantially flat surface, using a hopper for distribution.

I propose to fill the hopper 20 with powdered material, such as powdered metal 22, which hopper is disposed a suitable distance above an endless substantially flat conveyor belt 24 made of metal or fabric, or other suitable material and driven by suitable means (not shown) so that the powdered metal in the hopper 20 falls upon the surface of the belt 24 with the aid of gravity and is smoothed out thereon into a layer of substantially uniform thickness by a smoothing device 26. Beneath the belt 24 a supporting element such as steel strip 28 is moved in the same direction as the belt 24 so that as the belt 24 goes around the pulley 30, the powdered metal 22 progressively drops therefrom onto the moving surface of the strip 28 and forms a layer of substantially uniform thickness thereon regardless of the surface irregularities of the strip 28. The thickness of the powdered metal may be varied by controlling the relative speeds of the belt 24 and strip 28. Thus, if the belt and strip move at the same rate of speed, the thickness of the layer on strip 28 is substantially the same as the thickness of the layer on the belt 24. By increasing the relative speed of the strip, the thickness of the layer may be reduced and likewise by reducing the relative speed of the belt, the thickness of the layer may be increased. In this manner, any desired thickness of powdered metal may be obtained without the necessity of frequent adjustments of the smoothing device 26, although it is apparent that both the belt 24 and strip 28 may be moved at the same rate of speed and the thickness of the layer may be varied by changing the position of the hopper 20 and smoothing device 26 relative to the belt 24.

The strip 26 with the metal powder layer thereon may next pass into a sintering furnace of the type shown in the aforementioned patent.

Figure 2:
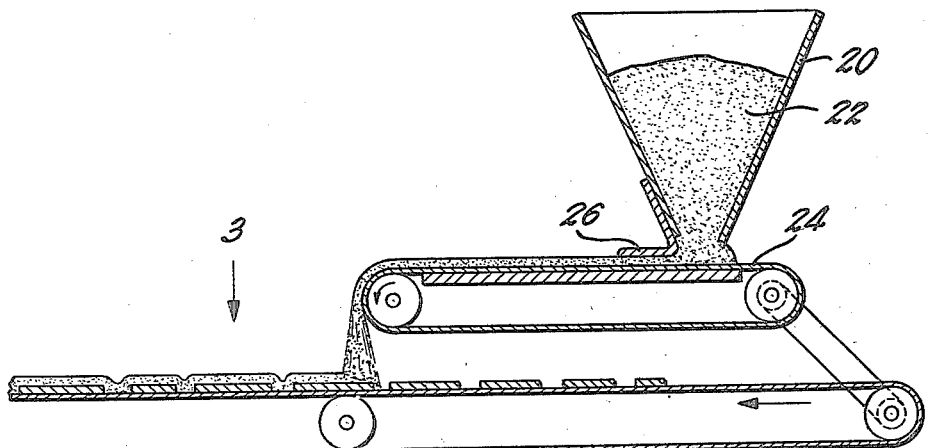
Fig. 2 shows another use of the invention wherein powdered material is being distributed upon the surfaces of various plate like articles.
Figure 3:
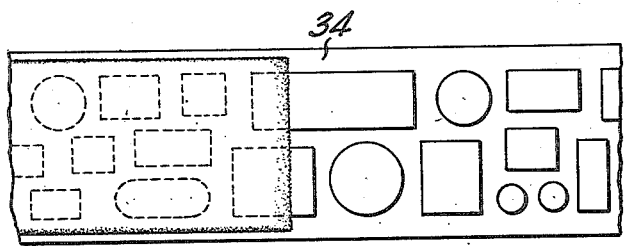
Fig. 3 is a fragmentary view taken in the direction of the arrow in Fig. 2.

In Fig. 2, I show the same principle being used to distribute powdered metal upon the surface of small irregularly shaped supporting elements such as plates of metal and the like which are carried by an endless conveyor belt 34. The belt 34 may pass directly into a sintering furnace but I prefer to remove the supporting elements from the belt 34 and then pass them thru the furnace so as to eliminate the excess metal powder which fills in between the plates. Sintering times and temperatures and conditions, etc., are well known to the art and may be found in the aforementioned patent.

If desired, a set of pressure rolls 36 may be provided to compress the powdered metal layer prior to its entrance into the sintering furnace 38 such as is shown in Fig. 4 or in some cases the pressure rolls may be provided at the exit end of the furnace as is shown in Fig. 5. In either case, these pressure rolls may be used to control the porosity of the layer. When the surface of the strip or support 28 is excessively irregular, the use of these rolls should be eliminated. However, when the irregularity is merely due to warpage, operations of pressure rolls may easily be accomplished.

The present invention may also be utilized to making porous material continuously in strip form wherein the density of the porous layer is variable from one side thereof to the other. Material of this type and method of making same intermittently are disclosed in copending applications S/N 326,235 and 326,220, both assigned to the assignee of the present application. In carrying out the present method, metal powders of varying grain sizes which have thoroughly been mixed are fed into the hopper 20 and are spread on the surface of belt 24. By varying the height of the belt 24 above the moving strip 28 and shown in dotted lines at 40 in Fig. 1, is possible to cause the powder to drop an appreciable distance and segregate, due to its grain size, whereby the larger particles fall upon the surface of the strip 28 prior to deposition of the finer particles. In this embodiment, the belt 24 and strip 28 should be traveling at the same rate of speed and it is also desirable although not entirely necessary if the drop is not too great, to provide a moving strata of air between the belt 24 and strip 28 which strata is moving at substantially the same rate of speed as the strip 28.

In most cases, it is sufficient, if the rate of movement of the strip 28 is relatively slow, to provide a chamber around the falling powder, which is substantially free from extraneous drafts. The segregation of the metal powders will occur upon the relative short drop thereof through the atmosphere, for example, 1 to 2 feet, whereas lesser distances may be used to control the segregation, for example, when substantially no segregation is desired. It is to be understood, that if a mixture of metal powder is being used, that segregation thereof will be caused by this drop if the powder varies in density, however, this can be best circumvented by using alloy powders wherein the actual density of each particle is the same but wherein the mass of varying sized particles differ to cause a differential rate of deposition upon the strip 28.

In all of the embodiments herein disclosed, the metal powder may be deposited directly upon a metal supporting element which subsequently is bonded to the porous metal layer, however, if porous material which is not bonded to the support is desired, expedients such as chrome steel supports, which have been oxidized may be used, or the support may be dusted with graphite or alundum prior to the deposition of the powder thereon. In this case, after sintering, the porous element may be lifted from the support.

From the foregoing, it is apparent that I have provided a simple and efficient method for distributing loose noncompacted powdered material in a layer of uniform thickness upon a supporting surface wherein slight irregularities of said supporting surface do not interfere with the distribution or uniformity of thickness of the powdered material.

While the embodiments of the present invention as herein disclosed, constitutes a preferred form, it is to be understood that other forms might be adopted, all coming within the scope of the claims which follow.

What is claimed is as follows:

1. In a method of making a porous metal article comprising the steps of uniformly distributing a loose noncompacted layer of metal powder upon a substantially flat moving surface, uniformly depositing said metal powder upon a supporting surface moving in the same direction as said first surface by causing said first surface to move in a direction perpendicular to the original plane of movement, and then sintering the non-compacted metal powder upon the supporting surface under suitable conditions and for a time sufficient to cause the metal powder to sinter together into a uniform porous layer.

2. A method of making composite strip stock including a porous metal layer bonded to a layer of a more dense metal, comprising the steps of distributing metal powder in a loose noncompacted layer of a uniform depth upon the surface of an endless conveyor belt, depositing said powdered metal layer upon the surface of a more dense metal strip passing beneath one end of said endless belt whereby the metal powder falls from the belt onto said metal surface, and then heating the more dense metal surface with the powdered metal thereon under suitable conditions and for a time sufficient to cause the metal powder to sinter together and form a highly porous metal layer bonded to the surface of the more dense metal layer.

3. In a method of providing a bonded layer of non-compacted metal powder of uniform thickness upon an uneven supporting surface, the steps of distributing a layer of non-compacted metal powder having a uniform thickness upon an even flat surface, then progressively depositing said layer from said even surface upon an uneven surface whereby the layer of metal powder is of a uniform thickness upon said uneven surface and then effecting a metallic bond of said deposited layer of uniform thickness to said uneven surface.

4. In a continuous method of making porous material having a varying porosity from one side thereof to the other comprising the steps of distributing a layer of loose metal powder upon a moving substantially flat supporting surface and leveling said powder into a layer of substantially uniform thickness, progressively removing said powder from said supporting surface and permitting the powder to fall through the atmosphere onto a second surface moving at the same rate of speed and in the same direction as said first surface, whereby particles having the greatest mass deposit upon said second surface prior to the deposition of particles having relatively less mass, and then sintering the non-compacted powder metal layer upon said second surface for forming a porous metal layer having a varying porosity from one side thereof to the other.

ARTHUR R. SHAW.